United States Patent
Weast

(10) Patent No.: US 10,045,214 B2
(45) Date of Patent: *Aug. 7, 2018

(54) AUTHENTICATION AND AUTHORIZATION IN A WEARABLE ENSEMBLE

(71) Applicant: Intel Corporation, Santa Clara, CA (US)

(72) Inventor: John Charles Weast, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/437,207

(22) Filed: Feb. 20, 2017

(65) Prior Publication Data

US 2017/0325090 A1 Nov. 9, 2017

Related U.S. Application Data

(63) Continuation of application No. 14/568,915, filed on Dec. 12, 2014, now Pat. No. 9,578,504.

(51) Int. Cl.
*H04M 1/66* (2006.01)
*H04W 12/06* (2009.01)
(Continued)

(52) U.S. Cl.
CPC .......... *H04W 12/06* (2013.01); *H04B 13/005* (2013.01); *H04W 4/80* (2018.02)

(58) Field of Classification Search
CPC .......... H04M 1/7253; H04M 2250/02; H04M 2215/32; H04M 15/58; H04M 15/745; H04M 15/8016; H04M 1/05; H04M 1/6066; H04M 1/72519; H04M 1/72572; H04M 2215/2026; H04M 2215/7414; H04M 2250/12; H04M 1/6041; H04W 12/06; H04W 4/008; H04W 4/02; H04W 88/02;
(Continued)

(56) References Cited

U.S. PATENT DOCUMENTS 9,578,504 B2 * 2/2017 Weast ............... H04W 12/06
2002/0068600 A1 * 6/2002 Chihara ............. H04B 1/385
455/557
(Continued)

OTHER PUBLICATIONS

"U.S. Appl. No. 14/568,915, Advisory Action dated Sep. 13, 2016", 4 pgs.
(Continued)

*Primary Examiner* — Nimesh Patel
(74) *Attorney, Agent, or Firm* — Schwegman Lundberg & Woessner, P.A.

(57) ABSTRACT

Various systems and methods for authentication and authorization in a wearable ensemble are described herein. A system for authenticating a wearable device includes an access module to access a second wearable device from a first wearable device, the first and second wearable devices being worn by a wearer and the first wearable device being a trusted device to the wearer, a measurement module to measure a distance from the first wearable device to the second wearable device, and an authentication module to authenticate the second wearable device when the distance is within a threshold range of an initialized distance.

21 Claims, 3 Drawing Sheets

(51) Int. Cl.
*H04B 13/00* (2006.01)
*H04W 4/80* (2018.01)

(58) Field of Classification Search
CPC ... H04W 68/005; H04W 4/021; H04W 4/023; H04W 4/027; H04W 4/028; H04W 76/023; H04W 12/04; H04W 12/08; H04W 24/02; H04W 40/244
See application file for complete search history.

(56) References Cited

U.S. PATENT DOCUMENTS

| | | | | |
|---|---|---|---|---|
| 2006/0028429 A1* | 2/2006 | Kanevsky | ............... | G06F 3/017 345/156 |
| 2006/0255963 A1* | 11/2006 | Thompson | ............. | G08C 17/02 340/12.23 |
| 2009/0051649 A1* | 2/2009 | Rondel | .................. | G06F 1/163 345/156 |
| 2009/0249478 A1* | 10/2009 | Rosener | ................. | G06F 21/31 726/19 |
| 2011/0022196 A1* | 1/2011 | Linsky | .................... | G06F 1/163 700/85 |
| 2012/0171958 A1* | 7/2012 | Cornett | ................. | H04W 4/008 455/41.2 |
| 2016/0174071 A1 | 6/2016 | Weast | | |

OTHER PUBLICATIONS

"U.S. Appl. No. 14/568,915, Final Office Action dated Jun. 23, 2016", 42 pgs.
"U.S. Appl. No. 14/568,915, Non Final Office Action dated Jan. 29, 2016", 36 pgs.
"U.S. Appl. No. 14/568,915, Notice of Allowance dated Oct. 6, 2016", 11 pgs.
"U.S. Appl. No. 14/568,915, Reponse filed Aug. 11, 2016 to Final Office Action dated Jun. 23, 2016", 13 pgs.
"U.S. Appl. No. 14/568,915, Response filed Apr. 29, 2016 to Non Final Office Action dated Jan. 29, 2016", 11 pgs.
"U.S. Appl. No. 14/568,915, Response filed Sep. 20, 2016 to Advisory Action dated Sep. 13, 2016", 13 pgs.

* cited by examiner

AUTHENTICATION AND AUTHORIZATION IN A WEARABLE ENSEMBLE

CROSS-REFERENCE TO RELATED APPLICANTS

This application is a continuation of U.S. patent application Ser. No. 14/568,915, filed Dec. 12, 2014, which is incorporated by reference herein in its entirety.

TECHNICAL FIELD

Embodiments described herein generally relate to inter-device communication and in particular, to authentication and authorization in a wearable ensemble.

BACKGROUND

Wearable devices are devices designed to be worn on a body. Wearable devices may include sensors or processing capabilities to observe the body or other information, and provide those observations or calculations made from those observations to people. Some modern wearable devices may communicate with each other to share information. A collection of these wearable devices on a body may be known as a Body Area Network (BAN). One communications mechanism for BAN devices is Body Coupled Communication (BCC), in which the body itself serves as a communications medium.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide authentication and authorization in a wearable ensemble. Wearable devices will become increasingly popular. In the near future, people may be wearing three, four, or more devices on a daily basis. Two or more devices on a person may be interconnected to share data or data communication networks. For example, one device may act as a gateway device to a larger network (e.g., the Internet). With the increase in the number of devices, maintaining connections, authentication among several devices, and other management become overly burdensome.

In order to address some of the authentication and management issues discussed above, a wearable ensemble of multiple wearable devices may be fully authenticated by first authenticating one device and then using that device to build out the authenticated circle of trust. The systems and methods described herein discuss a mechanism to build out the authenticated circle of trust based on the relative locations or distances from the first trusted device to one or more other devices.

An example is used to illustrate a mechanism for authenticating wearable devices. Devices are typically worn in the same place day-to-day. For example, people tend to wear their watch on the same wrist, or glasses-based devices are really only useful when worn on the face. Additionally, it is noted that people are generally different sizes and with enough data points, the size and shape of a person may be roughly unique. Using this information, the relative distances between worn devices may be used as a mechanism to verify that the devices are being worn by the same person.

Continuing in this example, a person may put on a wearable device with a user interface, such as a watch or a glasses-based device. The user may authenticate the first device using a password, personal identification number (PIN), biometric signature (e.g., fingerprint), or the like. The first device may be authenticated with the use of an auxiliary device, such as a smartphone or a laptop device. Once the first device is authenticated, then additional devices may be authenticated from the first device. An additional device may be authenticated by detecting that its distance from the first device is within a threshold of on expected distance between the two devices. If this condition is met, the additional device is considered to be one that is trusted.

Figure 1:
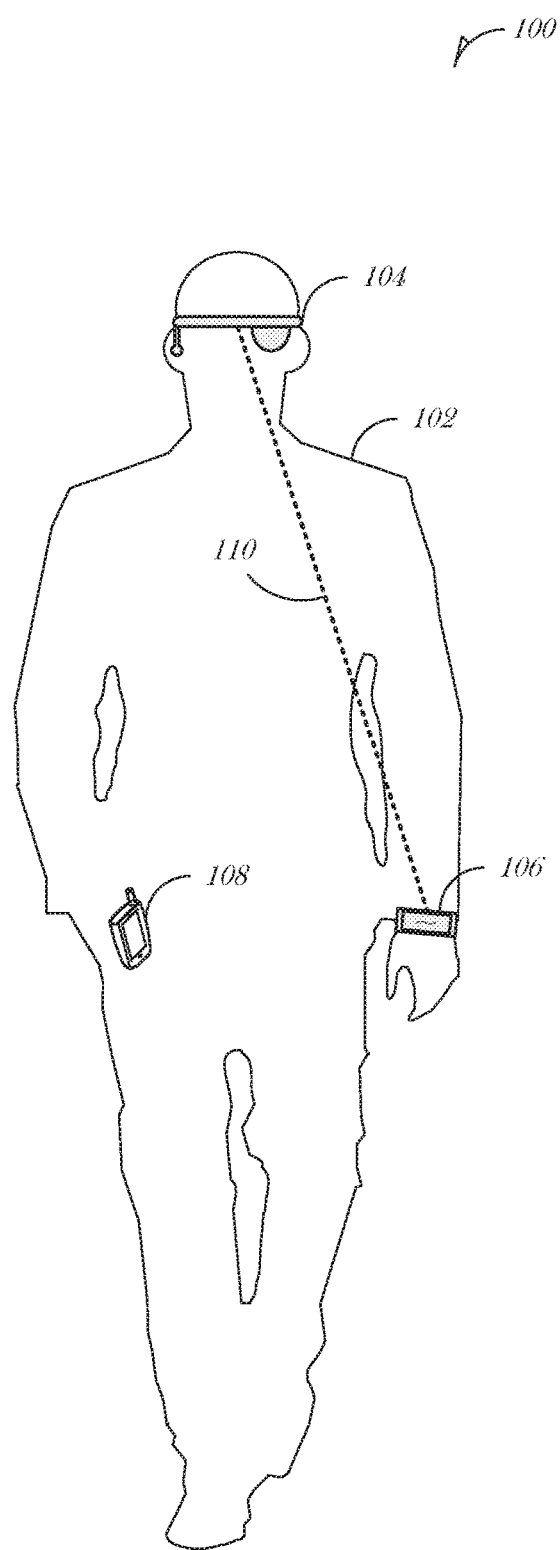
FIG. 1 is a schematic diagram illustrating an environment, according to an embodiment.

FIG. 1 is a schematic diagram illustrating an environment 100, according to an embodiment. The environment 100 includes a user 102, who is wearing a head worn wearable device 104 and a wrist-based wearable device 106. The user 102 also has a smartphone 108 in their pocket. Using the smartphone 108, the user 102 may authenticate the head worn wearable device 104. For example, the user 102 may authenticate to the smartphone 108, such as by providing a PIN or swiping their finger to provide a fingerprint. The smartphone 108 may then identify portable devices in the immediate area and prompt the user 102 as to whether one or more of the portable devices are known to the user 102. The user 102 may then identify the head worn wearable device 104 and indicate that this device is a trustworthy device. Alternatively, the user 102 may equip and use the head worn wearable device 104 to directly authenticate the device 104 using an interface on the device 104, such as a fingerprint scanner, keypad, or the like.

Once the head worn wearable device 104 is authenticated, it may continue to attempt to authenticate additional devices. In the example shown in FIG. 1, the additional device is the wrist-based wearable device 106. Communicating with the wrist-based wearable device 106, the head worn wearable device 104 may determine the approximate distance between the two devices 110. If the distance matches or is close (e.g., within a predefined threshold) to a previously measured distance, then the additional device (e.g., the wrist-based wearable device 106) is considered to be trustworthy and is authenticated to the body area network (BAN). Because the proximity distances are measured as distances on a body, the head worn wearable device 104 may assume that the wrist-based wearable device 106 is actually being worn (e.g., on the body) and is eligible to join the BAN.

Distance and proximity may be measured in any number of different ways. Bluetooth® includes proximity distance detection from other Bluetooth radios. Body Coupled Communication (BCC) may also be used as a proxy for the distance between two worn devices based on conductive properties of the body. A round-trip time may be used as well as other mechanisms to determine distance between two computing devices.

The distances between various devices and a master or root device may be used to "map" the devices on the user's body. For example, a user may wear a glasses-based device, a wrist-worn device, and a shoe insert device. The glasses-based device may be authenticated and act as the trusted device. Authentication may be performed directly with the glasses-based device, such as with a voice-match login, a retinal scan, a PIN code, or another authentication mechanism. The glasses-based device may have previously measured distances to the rest of the wearable ensemble (e.g., to the wrist-based device and the shoe insert device). The distances to the wrist-based device and shoe insert may be used to authenticate these devices. The distances may also be used to verify the identity of the user/wearer. For example, the distances may be used in a mathematical function, such as a linear aggregation, to verify that the devices are being worn by the expected user based on previously-measured distances. Such verification may be useful in environments where there are multiple users. As an example, a husband and wife may both own and use a smartwatch and a footpod. When not in use, they may store them in a basket, where the devices may intermix. When leaving for a run, the husband may grab the correct smartwatch, but his wife's footpod. Based on previously measured values, the root device (e.g., smartphone, glasses, smartwatch, footpod, etc.) may detect the discrepancy and notify the husband or the wife that the husband grabbed the wrong footpod.

The previously measured distance may be based on an initialization process. For example, when the user 102 first obtains the wrist-based wearable device 106, the user 102 may be prompted to put the wrist-based wearable device 106 on and then assume one or more poses. The user 102 may be asked to stand up straight with his arms by his side, then with his arms out, then with his arms up over his head. In each pose, the distance from a trusted wearable device (e.g., the head worn wearable device 104) is obtained. Then at a later time when the user 102 equips the wrist-based wearable device 106, the expected distance is referenced. The actual distance may be different based on the user's body position, so the expected distance may be based on detecting where the wearable devices are with respect to one another. For example, if the wrist-based wearable device 106 is detected as being above the head worn wearable device 104, then the distance measured while the user 102 was in the third pose is used as the reference distance.

In some cases, the user 102 may be asked to verify that they are wearing the additional device (e.g., wrist-based wearable device 106) or verify the authenticity of the additional device. The user 102 may be prompted with an audio, visual, or multimedia prompt via one or more devices, such as the smartphone 108 or the head worn wearable device 104. The user 102 may be asked to perform an action or activity with the additional (e.g., suspect) wearable device, such as to move their arm with the wrist-based wearable device 106 in a certain manner (e.g., move in a large circle in front of the user's body). Another requested action may be for the user 102 to move the location of the wrist-based wearable device 106 from one wrist to another wrist. This challenge-response type of activity may then be used to authenticate that the wrist-based wearable device 106 is actually being worn by the user 102, as opposed to just being in close proximity to the user 102.

The use of relative distances may also be used to verify that the correct devices are being worn. For example, the user 102 may have a spouse with similar or the same devices. One morning, the user 102 may inadvertently put the spouse's smartwatch on their wrist. Detecting that the distance is incorrect, another device (e.g., the head worn wearable device 104 or the smartphone 108) may notify the user 102 that a new device is active and attempting to join the BAN or that the user 102 is wearing an unauthorized device.

Figure 2:
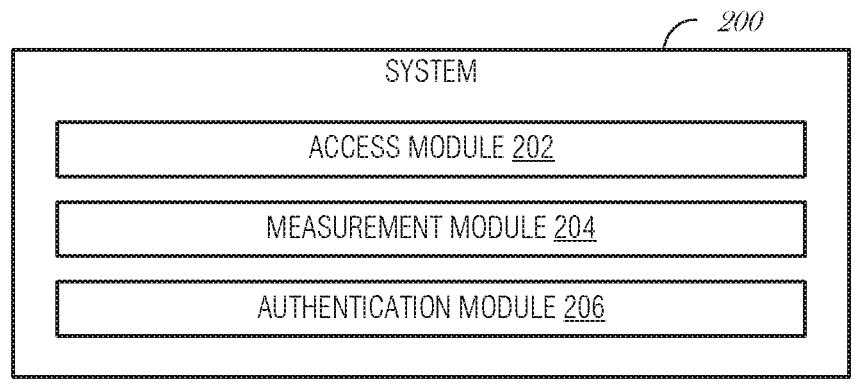
FIG. 2 is a block diagram illustrating a system for authenticating a wearable device, according to an embodiment.

FIG. 2 is a block diagram illustrating a system 200 for authenticating a wearable device, according to an embodiment. The system 200 includes an access module 202, a measurement module 204, and an authentication module 206. The system 200 may be incorporated into a wearable device (e.g., head worn wearable device 104) or another device (e.g., smartphone 108).

The access module may be configured to access a second wearable device from a first wearable device, the first and second wearable devices being worn by a wearer (e.g., user) and the first wearable device being a trusted device to the wearer.

In an embodiment, to access the second wearable device from the first wearable device, the access module 202 is to access the second wearable device with a short-range wireless telemetry protocol. The short-range wireless protocol may be Bluetooth® Low Energy.

In an embodiment, to access the second wearable device from the first wearable device, the access module 202 is to access the second wearable device with a body-coupled communication protocol. The BCC may be traditional BCC or a wave-guide BCC. Traditional BCC uses communication pathways through both the body and the environment. Wave-guide BCC uses communication pathways solely through the body.

The measurement module 204 may be configured to measure a distance from the first wearable device to the second wearable device.

In an embodiment, to measure the distance from the first wearable device to the second wearable device, the measurement module 204 is to transmit a signal from the second wearable device to the first wearable device, measure a signal strength of the signal, and calculate the distance from the signal strength. The signal strength may be measured using directional antennas.

In an embodiment, to measure the distance from the first wearable device to the second wearable device, the measurement module 204 is to transmit an initial data packet from the first wearable device to the second wearable device, receive a response data packet from the second wearable device at the first wearable device, measure a round-trip time based on the transmit time of the initial data packet and the receipt time of the response data packet, and calculate the distance based on the round-trip time. Other mechanisms that use round-trip time may be used.

The authentication module 206 may be configured to authenticate the second wearable device when the distance is within a threshold range of an initialized distance. In an embodiment, the threshold range comprises a percentage of the initialized distance. For example, the threshold range may be 5% of the initialized distance. Alternatively, the threshold range may be a fixed measurement, such as 10 centimeters. The threshold range may be considered a radius around the point where the initialized distance ends (e.g., the location of the device). So an expected distance would be the initialized distance plus or minus the threshold range.

In an embodiment, to authenticate the second wearable device, the authentication module 206 is to transmit a secure key from the first wearable device to the second wearable device. The secure key may be a shared secret (e.g., PIN, public-private key, etc.) needed to join the BAN or an external network (e.g., Wi-Fi network).

In a further embodiment, the system 200 may include an initialization module to set initialized distance. The initialization module may set the initialized distance by prompting the wearer of the first and second wearable devices to assume a position, measuring a distance between the first and second devices while the wearer is in the position and, setting the initialized distance as the distance between the first and second device. The position may be any of a various number of positions, such as standing straight with arms in a certain position, sitting, lying down, or the like. In an embodiment, the authentication module 206 may verify the wearer when the distance is within a threshold range of an initialized distance.

In a further embodiment, the system 200 may include a verification module to verify that the second wearable device is associated with the first wearable device before authenticating the second wearable device. In an embodiment, to verify the second wearable device is associated with the first wearable device, the verification module is to prompt the wearer to perform an action, determine that the wearer performed the action, and verify the second wearable device being associated with the first wearable device based on the determining that the wearer performed the action. This type of challenge-response verification is useful to ensure that the second wearable device is actually being worn by the wearer and is not merely in close proximity to the wearer. The action may be any type of action or compound actions. In an embodiment, the action comprises moving the second wearable device in a specific manner. In an embodiment, the action comprises moving the second wearable device from a first location on the wearer's body to a second location on the wearer's body.

Figure 3:
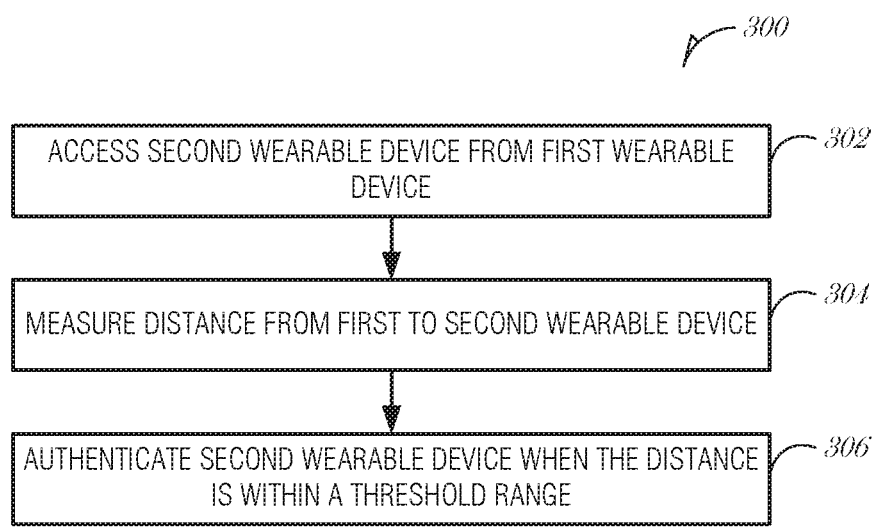
FIG. 3 is a flowchart illustrating a method of authenticating a wearable device, according to an embodiment.

FIG. 3 is a flowchart illustrating a method 300 of authenticating a wearable device, according to an embodiment. At block 302, a second wearable device is accessed from a first wearable device, the first and second wearable devices being worn by a wearer and the first wearable device being a trusted device to the wearer. In an embodiment, accessing the second wearable device from the first wearable device comprises accessing the second wearable device with a short-range wireless telemetry protocol. In an embodiment, accessing the second wearable device from the first wearable device comprises accessing the second wearable device with a body-coupled communication protocol At block 304, a distance from the first wearable device to the second wearable device is measured. In an embodiment, measuring the distance from the first wearable device to the second wearable device comprises transmitting a signal from the second wearable device to the first wearable device, measuring a signal strength of the signal, and calculating the distance from the signal strength.

In an embodiment, measuring the distance from the first wearable device to the second wearable device comprises transmitting an initial data packet from the first wearable device to the second wearable device, receiving a response data packet from the second wearable device at the first wearable device, measuring a round-trip time from based on the transmit time of the initial data packet and the receipt time of the response data packet, and calculating the distance based on the round-trip time.

At block 306, the second wearable device is authenticated when the distance is within a threshold range of an initialized distance. In an embodiment, the threshold range comprises a percentage of the initialized distance. In an embodiment, authenticating the second wearable device comprises transmitting a secure key from the first wearable device to the second wearable device.

In a further embodiment, the initialized distance is set by prompting the wearer of the first and second wearable devices to assume a position, measuring a distance between the first and second devices while the wearer is in the position, and setting the initialized distance as the distance between the first and second device. In a further embodiment, the method 300 includes verifying the wearer when the distance is within the threshold range of the initialized distance. For example, the distances of several devices may be initially measured and stored, such that at a later time, when a person puts the devices on, the person's identity can be verified using the measurements. This is based on the general observation that most people have distinct body measurements, especially as the number of devices and corresponding measurements increase.

In a further embodiment, the method 300 includes verifying the second wearable device is associated with the first wearable device before authenticating the second wearable device. In an embodiment, verifying the second wearable device is associated with the first wearable device comprises prompting the wearer to perform an action, determining that the wearer performed the action, and verifying the second wearable device being associated with the first wearable device based on the determining that the wearer performed the action. In an embodiment, the action comprises moving the second wearable device in a specific manner. In an embodiment, the action comprises moving the second wearable device from a first location on the wearer's body to a second location on the wearer's body.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
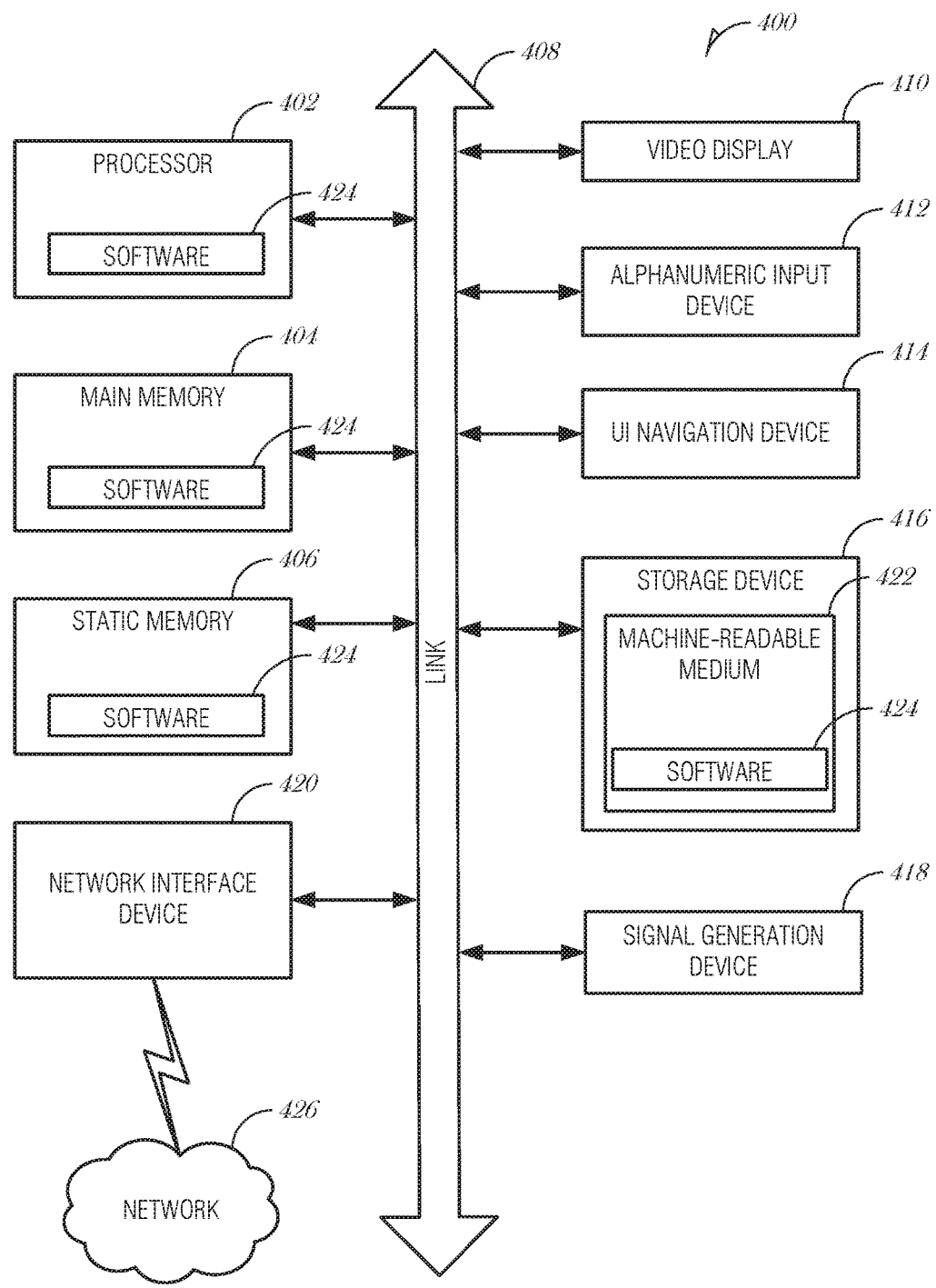
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for authenticating a wearable device (such as a device, apparatus, or machine) comprising: an access module to access a second wearable device from a first wearable device, the first and second wearable devices being worn by a wearer and the first wearable device being a trusted device to the wearer; a measurement module to measure a distance from the first wearable device to the second wearable device; and an authentication module to authenticate the second wearable device when the distance is within a threshold range of an initialized distance.

In Example 2, the subject matter of Example 1 may include, wherein to access the second wearable device from the first wearable device, the access module is to: access the second wearable device with a short-range wireless telemetry protocol.

In Example 3, the subject matter of any one of Examples 1 to 2 may include, wherein to access the second wearable device from the first wearable device, the access module is to: access the second wearable device with a body-coupled communication protocol.

In Example 4, the subject matter of any one of Examples 1 to 3 may include, wherein to measure the distance from the first wearable device to the second wearable device, the measurement module is to: transmit a signal from the second wearable device to the first wearable device; measure a signal strength of the signal; and calculate the distance from the signal strength.

In Example 5, the subject matter of any one of Examples 1 to 4 may include, wherein to measure the distance from the first wearable device to the second wearable device, the measurement module is to: transmit an initial data packet from the first wearable device to the second wearable device; receive a response data packet from the second wearable device at the first wearable device; measure a round-trip time from based on the transmit time of the initial data packet and the receipt time of the response data packet; and calculate the distance based on the round-trip time.

In Example 6, the subject matter of any one of Examples 1 to 5 may include, wherein to authenticate the second wearable device, the authentication module is to: transmit a secure key from the first wearable device to the second wearable device.

In Example 7, the subject matter of any one of Examples 1 to 6 may include, wherein the threshold range comprises a percentage of the initialized distance.

In Example 8, the subject matter of any one of Examples 1 to 7 may include, an initialization module to set initialized distance by: prompting the wearer of the first and second wearable devices to assume a position; measuring a distance between the first and second devices while the wearer is in the position; and setting the initialized distance as the distance between the first and second device.

In Example 9, the subject matter of any one of Examples 1 to 8 may include, wherein the authentication module is to: verify the wearer when the distance is within the threshold range of the initialized distance.

In Example 10, the subject matter of any one of Examples 1 to 9 may include, a verification module to verify the second wearable device is associated with the first wearable device before authenticating the second wearable device.

In Example 11, the subject matter of any one of Examples 1 to 10 may include, wherein to verify the second wearable device is associated with the first wearable device, the verification module is to: prompt the wearer to perform an action; determine that the wearer performed the action; and verify the second wearable device being associated with the first wearable device based on the determining that the wearer performed the action.

In Example 12, the subject matter of any one of Examples 1 to 11 may include, wherein the action comprises moving the second wearable device in a specific manner.

In Example 13, the subject matter of any one of Examples 1 to 12 may include, wherein the action comprises moving the second wearable device from a first location on the wearer's body to a second location on the wearer's body.

In Example 13, the subject matter of any one of Examples 1 to 12 may include, wherein the action comprises moving the second wearable device from a first location on the wearer's body to a second location on the wearer's body.

Example 14 includes subject matter for authenticating a wearable device (such as a method, means for performing acts, machine readable medium including instructions that when performed by a machine cause the machine to performs acts, or an apparatus to perform) comprising: accessing a second wearable device from a first wearable device, the first and second wearable devices being worn by a wearer and the first wearable device being a trusted device to the wearer; measuring a distance from the first wearable device to the second wearable device; and authenticating the second wearable device when the distance is within a threshold range of an initialized distance.

In Example 15, the subject matter of Example 14 may include, wherein accessing the second wearable device from the first wearable device comprises: accessing the second wearable device with a short-range wireless telemetry protocol.

In Example 16, the subject matter of any one of Examples 14 to 15 may include, wherein accessing the second wearable device from the first wearable device comprises: accessing the second wearable device with a body-coupled communication protocol.

In Example 17, the subject matter of any one of Examples 14 to 16 may include, wherein measuring the distance from the first wearable device to the second wearable device comprises: transmitting a signal from the second wearable device to the first wearable device; measuring a signal strength of the signal; and calculating the distance from the signal strength.

In Example 18, the subject matter of any one of Examples 14 to 17 may include, wherein measuring the distance from the first wearable device to the second wearable device comprises: transmitting an initial data packet from the first wearable device to the second wearable device; receiving a response data packet from the second wearable device at the first wearable device; measuring a round-trip time from based on the transmit time of the initial data packet and the receipt time of the response data packet; and calculating the distance based on the round-trip time.

In Example 19, the subject matter of any one of Examples 14 to 18 may include, wherein authenticating the second wearable device comprises: transmitting a secure key from the first wearable device to the second wearable device.

In Example 20, the subject matter of any one of Examples 14 to 19 may include, wherein the threshold range comprises a percentage of the initialized distance.

In Example 21, the subject matter of any one of Examples 14 to 20 may include, wherein the initialized distance is set by: prompting the wearer of the first and second wearable devices to assume a position; measuring a distance between the first and second devices while the wearer is in the position; and setting the initialized distance as the distance between the first and second device.

In Example 22, the subject matter of any one of Examples 14 to 21 may include, verifying the wearer when the distance is within the threshold range of the initialized distance.

In Example 23, the subject matter of any one of Examples 14 to 22 may include, verifying the second wearable device is associated with the first wearable device before authenticating the second wearable device.

In Example 24, the subject matter of any one of Examples 14 to 23 may include, wherein verifying the second wearable device is associated with the first wearable device comprises: prompting the wearer to perform an action; determining that the wearer performed the action; and verifying the second wearable device being associated with the first wearable device based on the determining that the wearer performed the action.

In Example 25, the subject matter of any one of Examples 14 to 24 may include, wherein the action comprises moving the second wearable device in a specific manner.

In Example 26, the subject matter of any one of Examples 14 to 25 may include, wherein the action comprises moving the second wearable device from a first location on the wearer's body to a second location on the wearer's body.

Example 27 includes at least one machine-readable medium including instructions, which when executed by a machine, cause the machine to perform operations of any of the Examples 14-26.

Example 28 includes an apparatus comprising means for performing any of the Examples 14-26.

Example 29 includes subject matter for authenticating a wearable device (such as a device, apparatus, or machine) comprising: means for accessing a second wearable device from a first wearable device, the first and second wearable devices being worn by a wearer and the first wearable device being a trusted device to the wearer; means for measuring a distance from the first wearable device to the second wearable device; and means for authenticating the second wearable device when the distance is within a threshold range of an initialized distance.

In Example 30, the subject matter of Example 29 may include, wherein the means for accessing the second wearable device from the first wearable device comprise: means for accessing the second wearable device with a short-range wireless telemetry protocol.

In Example 31, the subject matter of any one of Examples 29 to 30 may include, wherein the means for accessing the second wearable device from the first wearable device comprise: means for accessing the second wearable device with a body-coupled communication protocol.

In Example 32, the subject matter of any one of Examples 29 to 31 may include, wherein the means for measuring the distance from the first wearable device to the second wearable device comprise: means for transmitting a signal from the second wearable device to the first wearable device; means for measuring a signal strength of the signal; and means for calculating the distance from the signal strength.

In Example 33, the subject matter of any one of Examples 29 to 32 may include, wherein the means for measuring the distance from the first wearable device to the second wearable device comprise: means for transmitting an initial data packet from the first wearable device to the second wearable device; means for receiving a response data packet from the second wearable device at the first wearable device; means for measuring a round-trip time from based on the transmit time of the initial data packet and the receipt time of the response data packet; and means for calculating the distance based on the round-trip time.

In Example 34, the subject matter of any one of Examples 29 to 33 may include, wherein the means for authenticating the second wearable device comprise: means for transmitting a secure key from the first wearable device to the second wearable device.

In Example 35, the subject matter of any one of Examples 29 to 34 may include, wherein the threshold range comprises a percentage of the initialized distance.

In Example 36, the subject matter of any one of Examples 29 to 35 may include, wherein the initialized distance is set by: prompting the wearer of the first and second wearable devices to assume a position; measuring a distance between the first and second devices while the wearer is in the position; and setting the initialized distance as the distance between the first and second device.

In Example 37, the subject matter of any one of Examples 29 to 36 may include, means for verifying the wearer when the distance is within the threshold range of the initialized distance.

In Example 38, the subject matter of any one of Examples 29 to 37 may include, means for verifying the second wearable device is associated with the first wearable device before authenticating the second wearable device.

In Example 39, the subject matter of any one of Examples 29 to 38 may include, wherein the means for verifying the second wearable device is associated with the first wearable device comprise: means for prompting the wearer to perform an action; means for determining that the wearer performed the action; and means for verifying the second wearable device being associated with the first wearable device based on the determining that the wearer performed the action.

In Example 40, the subject matter of any one of Examples 29 to 39 may include, wherein the action comprises moving the second wearable device in a specific manner.

In Example 41, the subject matter of any one of Examples 29 to 40 may include, wherein the action comprises moving the second wearable device from a first location on the wearer's body to a second location on the wearer's body.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A first wireless computing device, comprising:
   interface circuitry to access a second wireless computing device from the first wireless computing device;
   storage device to store instructions; and
   processing circuitry configured to execute the stored instructions to determine a value corresponding to a distance from the first computing device to the second computing device, and authenticate the second computing device when the distance is within a threshold distance,
   wherein to determine the value corresponding to the distance from the first computing device to the second wireless computing device, the processing circuitry is to:
   transmit, at a transmit time, first data from the first wireless computing device to the second wireless computing device;
   receive, at a receipt time, second data from the second wireless computing device at the first wireless computing device;
   measure a round-trip time based on the transmit time of the first data and the receipt time of the second data; and
   calculate the value corresponding to the distance from the first wireless computing device to the second wireless computing device based on the round-trip time.

2. The first wireless computing device according to claim 1, wherein the processing circuitry is further configured to execute the stored instructions to:
   transmit security information from the first computing device to the second computing device to perform an initial authentication of the second computing device.

3. The first wireless computing device according to claim 2, wherein the security information comprises a secure key.

4. The first wireless computing device according to claim 1, wherein, to access the second wireless computing device from the first wireless computing device, the interface circuitry is to:
   access the second computing device using a wireless communication technology.

5. The first wireless computing device according to claim 1, wherein the processing circuitry is to:
   verify the second wireless computing device is associated with the first wireless computing device before authenticating the second wireless computing device.

6. The first wireless computing device according to claim 5, wherein to verify the second wireless computing device is associated with the first computing device, the processing circuitry is to:
   prompt a wearer of the second wireless computing device to perform an action;
   determine that the wearer performed the action; and
   verify the second wireless computing device being associated with the first wireless computing device based on the determining that the wearer performed the action.

7. The first wireless computing device according to claim 6, wherein the action comprises moving the second wearable wireless computing device in a specific manner.

8. The first wireless computing device according to claim 6, wherein the action comprises moving the second wireless computing device from a first location on the wearer's body to a second location on the wearer's body.

9. A method for authenticating a wireless computing device, the method comprising:
   accessing a second wireless computing device from a first wireless computing device;
   determining a value corresponding to a distance from the first wireless computing device to the second wireless computing device, wherein determining the value comprises:
   transmitting, at a transmit time, first data from the first wireless computing device to the second wireless computing device;
   receiving, at a receipt time, second data from the second wireless computing device at the first wireless computing device;
   measuring a round-trip time based on the transmit time of the first data and the receipt time of the second data; and
   calculating the value corresponding to the distance from the first wireless computing device to the second wireless computing device based on the round-trip time; and
   authenticating the second wireless computing device when the distance is within a threshold distance.

10. The method according to claim 9, further comprising:
    transmitting security information from the first wireless computing device to the second wireless computing device to perform an initial authentication of the second wireless computing device.

11. The method according to claim 10, wherein the security information comprises a secure key.

12. The method according to claim 9, wherein accessing the second wireless computing device comprises:
    accessing the second wireless computing device using a wireless communication technology.

13. The method according to claim 9, further comprising:
    verifying the second wireless computing device is associated with the first wireless computing device before authenticating the second wireless computing device.

14. The method according to claim 13, wherein the verifying comprises:
    prompting a wearer of the second wireless computing device to perform an action;
    determining that the wearer performed the action; and
    verifying the second wireless computing device is associated with the first computing device based on the determining that the wearer performed the action.

15. The method according to claim 14, wherein the action comprises moving the second wireless computing wearable device in a specific manner.

16. A non-transitory computer-readable storage medium that stores instructions for execution by one or more processors of a first wireless computing device, the instructions to configure the one or more processors to cause the first wireless computing device to:
    access a second wireless computing device from the first wireless computing device;
    determine a value corresponding to a distance from the first wireless computing device to the second wireless computing device, wherein to determine the value, the instructions further cause the first wireless computing device to:
    transmit, at a transmit time, first data from the first wireless computing device to the second wireless computing device;
    receive, at a receipt time, second data from the second wireless computing device at the first wireless computing device;

measure a round-trip time based on the transmit time of the first data and the receipt time of the second data; and calculate the value corresponding to the distance from the first wireless computing device to the second wireless computing device based on the round-trip time; and authenticate the second wireless computing device when the distance is within a threshold distance.

17. The non-transitory computer-readable storage medium of claim 16, wherein the one or more processors further cause the first wireless computing device to:

transmit security information from the first wireless computing device to the second wireless computing device to perform an initial authentication of the second wireless computing device.

18. The non-transitory computer-readable storage medium of claim 17, wherein the security information comprises a secure key.

19. The non-transitory computer-readable storage medium of claim 16, wherein the one or more processors further cause the first wireless computing device to:

access the second wireless computing device using a wireless communication technology.

20. The non-transitory computer-readable storage medium of claim 16, wherein the one or more processors further cause the first wireless computing device to:

verify the second wireless computing device is associated with the first computing device before authenticating the second wireless computing device.

21. The non-transitory computer-readable storage medium of claim 20, wherein the one or more processors further cause the first wireless computing device to:

prompt a wearer of the second computing device to perform an action;

determine that the wearer performed the action; and verify the second wireless computing device is associated with the first wireless computing device based on the determining that the wearer performed the action.

* * * * *